United States Patent [19]
Takenaka et al.

[11] Patent Number: 5,533,870
[45] Date of Patent: Jul. 9, 1996

[54] PISTON TYPE COMPRESSOR

[75] Inventors: Kenji Takenaka; Keiichi Kato; Chuichi Kawamura, all of Kariya, Japan

[73] Assignee: Kabushiki Kaisha Toyoda Jidoshokki Seisakusho, Kariya, Japan

[21] Appl. No.: 256,429

[22] PCT Filed: Nov. 11, 1993

[86] PCT No.: PCT/JP93/01649

§ 371 Date: Jul. 12, 1994

§ 102(e) Date: Jul. 12, 1994

[87] PCT Pub. No.: WO94/11635

PCT Pub. Date: May 26, 1994

[30] Foreign Application Priority Data

Nov. 13, 1992 [JP] Japan ................................. 4-304199

[51] Int. Cl.$^6$ ....................................................... F04B 1/12
[52] U.S. Cl. ...................... 417/269; 417/312; 137/512.1; 137/855
[58] Field of Search ................................. 417/269, 312; 181/229, 403; 137/855, 856, 512.1

[56] References Cited

U.S. PATENT DOCUMENTS

| | | | |
|---|---|---|---|
| 4,274,813 | 6/1981 | Kiohi et al. | 417/269 |
| 4,930,995 | 6/1990 | Suzuki et al. | 417/312 |
| 5,125,803 | 6/1992 | Terauchi | 417/269 |
| 5,236,312 | 8/1993 | Finn et al. | 417/269 |

FOREIGN PATENT DOCUMENTS

| | | |
|---|---|---|
| 50-85905 | 7/1975 | Japan . |
| 51-40609 | 4/1976 | Japan . |
| 62-31673 | 8/1987 | Japan . |
| 212080 | 1/1990 | Japan . |

*Primary Examiner*—Charles Freay
*Attorney, Agent, or Firm*—Brooks Haidt Haffner & Delahunty

[57] ABSTRACT

A housing has a refrigerant gas suction chamber at its center portion and a refrigerant gas discharge chamber at its peripheral portion. A valve plate between a cylinder block and a housing has a plurality of suction holes for connecting a plurality of cylinder bores in the cylinder block to the suction chamber and suction valves capable of opening the suction holes. The valve plate has a plurality of discharge holes for connecting the cylinder bores to the discharge chamber and discharge valves capable of opening the discharge holes. Pistons are reciprocatably accommodated in the cylinder bores. In accordance with reciprocation of the pistons, refrigerant gas is led into the cylinder bores from the suction chamber via the suction valves and suction holes. This refrigerant gas is compressed in the cylinder bores and is discharged to the discharge chamber via the discharge valves and discharge holes. A plurality of shielding members are provided in the discharge chamber in association with the plurality of discharge valves such that refrigerant gas discharged from any one of the plurality of discharge holes bypasses the discharge valves which are associated with the other discharge holes.

13 Claims, 5 Drawing Sheets

PISTON TYPE COMPRESSOR

TECHNICAL FIELD

The present invention relates to a piston type compressor for use in, for example, an air conditioning system for a vehicle.

BACKGROUND ART

In the field of compressor technology, it is generally known to use piston type compressors with motorized vehicles in order to supply conditioning to the vehicle's interior. One example of this is a conventional socking swash plate type compressor. This type of compressor incorporates a plurality of pistons that reciprocate in a plurality of cylinder bores formed in a cylinder block as the rotary shaft rotates. As the pistons reciprocate, refrigerant gas, is supplied from a suction chamber to the cylinder bores where the gas is compressed. The compressed refrigerant gas then forcibly opens a discharge valve provided in a valve plate associated with each cylinder bore, and is discharged into a discharge chamber through a discharge hole. The compressed refrigerant gas is then supplied to an external refrigeration circuit through an outlet port which communicates with the discharge chamber.

In conventional compressors, however, after the refrigerant gas gets discharged through the discharge hole, and as it travels toward the outlet port in the discharge chamber, the gas encounters a second discharge valve different from the one corresponding to the aforementioned discharge hole. This second discharge valve, when struck by the refrigerant gas, tends to vibrate and generate noise. Unfortunately, since each discharge hole in the conventional compressor has its own discharge valve, increasing the number of discharge holes results in increased compressor generated noise.

One proposed solution to this problem, as described in Japanese Unexamined Patent Publication No. 51-40609, utilizes partitions provided inside the compressor's discharge chamber to eliminate discharge valve vibration. The partitions described in this publication define a plurality of subsidiary discharge chambers which cooperate with the discharge holes in the cylinder bores. These discharge chambers communicate with each other via a communication passage formed by a plurality of holes in the cylinder block and the valve plate. The refrigerant gas in this compressor, once discharged through each discharge hole, is supplied to a first associated subsidiary discharge chamber and then travels to the adjoining subsidiary discharge chamber via the communication passage. This design allows the pulsations of compressed refrigerant gas to be suppressed in contrast to compressors having no such partitions. Despite its design however, even this compressor can fail to eliminate all the vibration and pulsations that occur during the discharge of compressed refrigerant gas. Consequently even this compressor suffers from the aforementioned noise problem.

It is therefore an object of the present invention to provide a piston type compressor that eliminates conventional compressor noise generation by reducing discharge valve vibration during that time when compressed refrigerant gas flows through the compressor's discharge chamber.

DISCLOSURE OF THE INVENTION

To achieve the above object, a housing is secured to a cylinder block having a plurality of cylinder bores formed therein according to the present invention. The housing includes a suction chamber formed in the center portion of the housing that receives uncompressed refrigerant gas, and a discharge chamber formed in the housing's peripheral portion that retains compressed refrigerant gas. A valve plate disposed between the cylinder block and the housing incorporates both a plurality of suction holes that connect the cylinder bores to the suction chamber, and a plurality of suction valves capable of opening the suction holes. The valve plate further has discharge holes that connect the cylinder bores to the discharge chamber and discharge valves that allow the discharge holes to open. A plurality of pistons that reciprocate in the plurality of cylinder bores effectively cause the suction valves to allow the refrigerant gas to flow through the suction holes into the cylinder bores from the suction chamber. After being compressed in the cylinder bores, the refrigerant gas forcibly opens the discharge valves, flows through the opened discharge holes and gets discharged into the discharge chamber. A plurality of shielding members are provided in the discharge chamber in association with the plurality of discharge valves. The shielding members obstruct the flow of the gas discharged from the discharge holes in such a way that the gas flows around without directly impinging upon the other discharge holes.

DETAILED DESCRIPTION OF THE PREFERRED EMBODIMENTS

A rocking swash plate type variable displacement piston type compressor according to one embodiment of the present invention will now be described with reference to FIGS. 1 through 4.

Figure 1:
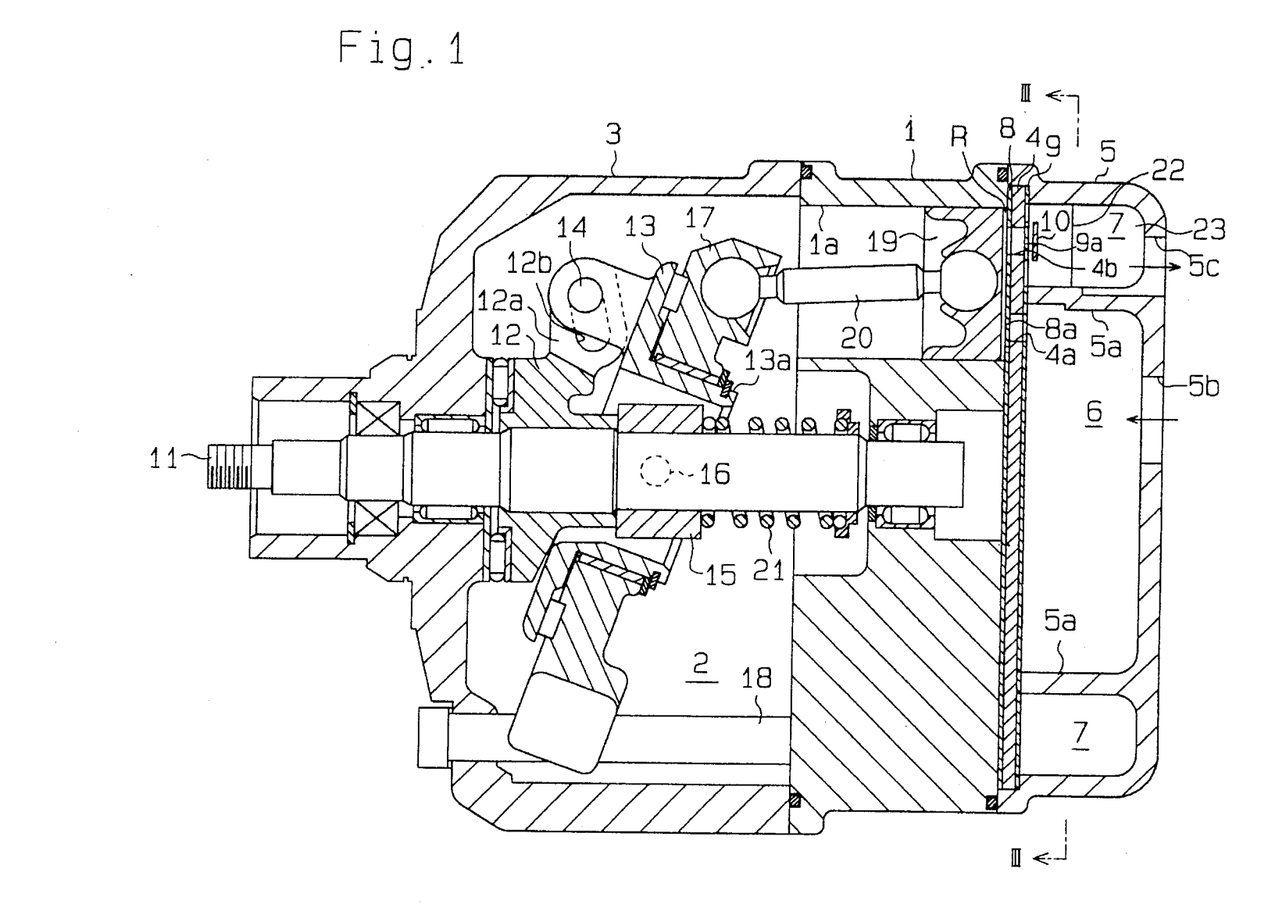
FIG. 1 is a vertical cross-sectional view showing an overall piston type compressor embodying the present invention.

As shown in FIG. 1, this piston type compressor has a cylinder block 1 with a plurality of cylinder bores 1a (five in this embodiment; see FIG. 3) formed at equiangular intervals around the center axis of the cylinder block 1. A front housing 3, forming a crank chamber 2, is secured to the front end surface of the cylinder block 1. A rear housing 5 is secured to the rear end surface of the cylinder block 1, with a valve plate 4 disposed therebetween. An annular partition 5a is formed in the rear housing 5. A suction chamber 6 is formed within the partition 5. An annular discharge chamber 7 is formed outside of the partition 5.

The suction chamber 6 is connected to an external refrigerant suction passage by a suction port 5b formed in approximately the center portion of the rear housing 5. The discharge chamber 7 is connected to an external refrigerant discharge passage by an outlet port 5c formed in the peripheral portion of the rear housing 5.

A plurality of suction holes 4a, associated with cylinder bores 1a and formed at equiangular intervals in the valve plate 4, are connected to the suction chamber 6. A plurality of discharge holes 4b, also associated with cylinder bores 1a and formed at equiangular intervals in the valve plate 4, are connected to the discharge chamber 7. A suction-valve forming plate 8 and a discharge-valve forming plate 9 are attached to the front and back surfaces of the valve plate 4. The suction-valve forming plate 8 has elastic suction valves 8a, and the discharge-valve forming plate 9 has elastic discharge valves 9a. At its distal end portion, each discharge valve 9a operates to open and close the associated discharge hole 4b. At its proximal end portion, each valve 9a integrated with the discharge-valve forming plate 9 at a position spaced from the discharge hole 4b. The individual discharge valves 9a are arranged in the circumferential direction along the outline of the discharge chamber 7. The suction valves 8a, radially arranged on the plate 8, and integrated at their proximal end portions with the suction-valve forming plate 8, operate at their distal end portions to open and close the suction holes 4a. Each of the valves 8a and 9a moves between a position that opens or closes the associated hole 4a, 4b.

A plurality of retainers 10 made of a rigid material are provided in the discharge chamber 7. The retainers 10 have their proximal end portions secured to the proximal end portions of the associated discharge valves 9a. The distal end portions of retainers 10 are located on the distal-end sides of the associated discharge valves. When the discharge holes are opened by the discharge valves 9a, the retainers 10 restrict the opening positions of the discharge valves 9a.

A rotary shaft 11 is rotatably and coaxially supported at the center axes of the cylinder block 1 and the front housing 3. A drive plate 12, securely fitted on the rotary shaft 11, incorporates a support arm 12a having an elongated hole 12b on the drive plate 12. A rotary plate 13 is fitted on the rotary shaft 11. A slider 15, attached to the rotary shaft 11, reciprocates along shaft 11 in a forward and backward direction. The slider 15 is provided with a coupling pin 16 which rotatably supports a boss portion 13a of the rotary plate 13. The rocking range of the rotary plate 13 is restricted by the engagement of the coupling pin 14 with the elongated hole 12b.

A swash plate 17 is attached to the boss portion 13a of the rotary plate 13 in a relatively rotational manner. Since rotation of the swash plate 17 is restricted by a rod 18, only forward and backward movements of the swash plate 17 are permitted. Pistons 19 are reciprocatably retained in the respective cylinder bores 1a. Those pistons 19 are coupled to the swash plate 17 by piston rods 20, respectively. A spring 21 pushes the rotary plate 13 and the swash plate 17 frontward via the slider 15, causing the swash plate 17 to move to a maximum inclined position.

In the above-described compressor as shown in FIG. 1, the swash plate 17 swings forward and backward when the motion of rotary shaft 11 rotates the rotary plate 13 via the drive plate 12 and coupling pin 14. The swash plate's forward and backward movement causes the pistons 19 to reciprocate forward and backward in their respective cylinder bores 1a via the rods 20. Consequently, refrigerant gas, supplied from the suction chamber 6 into compression chambers R in the cylinder bores 1a via the suction holes 4a, is compressed by the pistons 19. The pressure of the compressed refrigerant gas forcibly opens the distal end portions of the discharge valves 9a. This allows the refrigerant gas to be discharged into the discharge chamber 7 via the discharge holes 4b as shown by arrows in FIG. 2. The discharged refrigerant gas is then supplied via the outlet port 5c to the external discharge passage.

The suction pressure of the refrigerant gas and the pressure in the crank chamber 2 respectively act on the front and back surfaces of each piston 19. The inclination of the swash plate 17 about the coupling pin 16 changes via the piston rod 21 due to the difference between the suction pressure and crank chamber pressure. Accordingly, the stroke of the piston 19 is altered, changing the discharge displacement. The pressure in the crank chamber 2 is adjusted by a control valve (not shown) provided in the cylinder block 1 or the rear housing 5.

Figure 2:
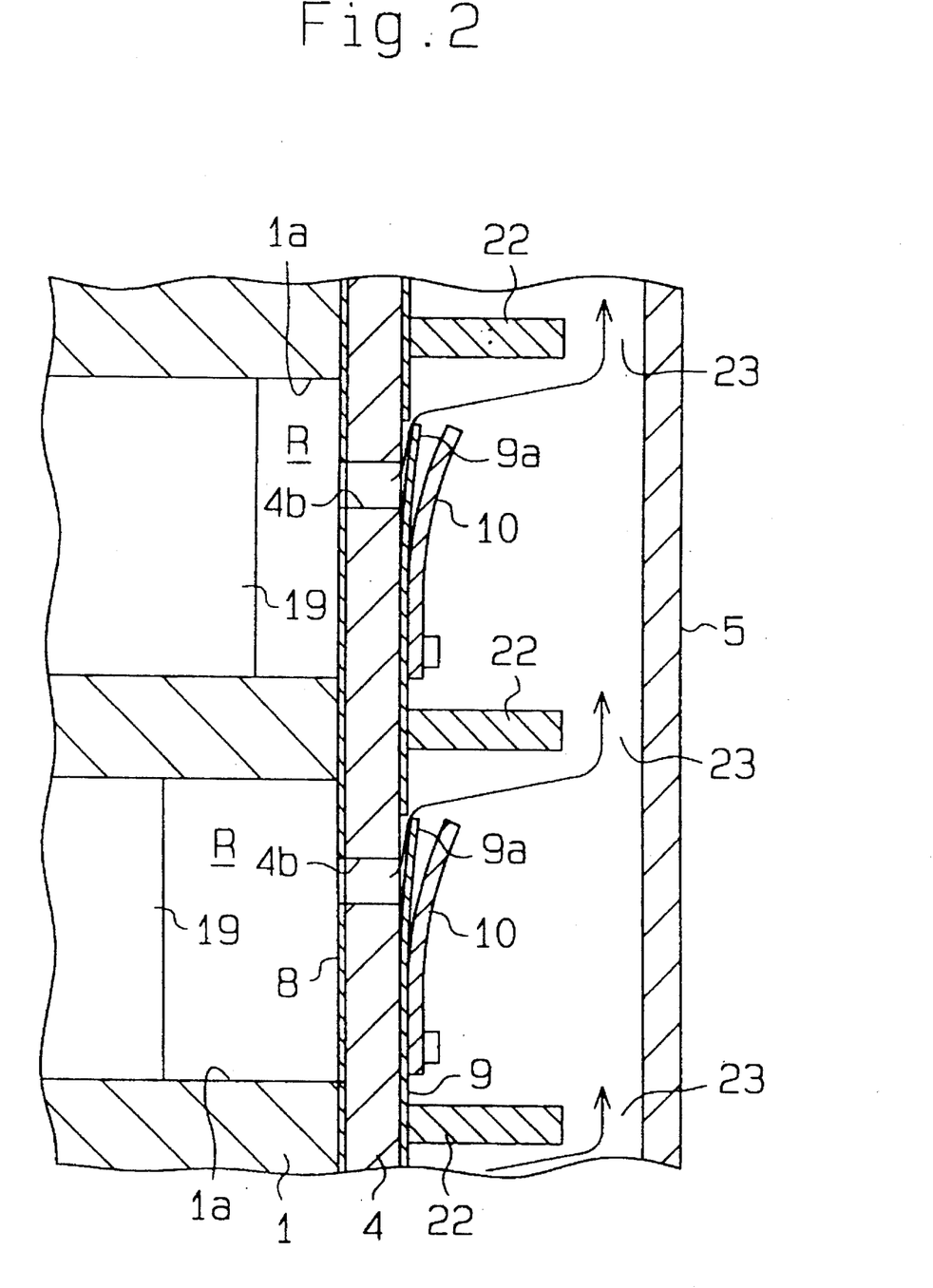
FIG. 2 is a cross-sectional view showing an enlarged portion of the compressor shown in FIG. 1.
Figure 3:
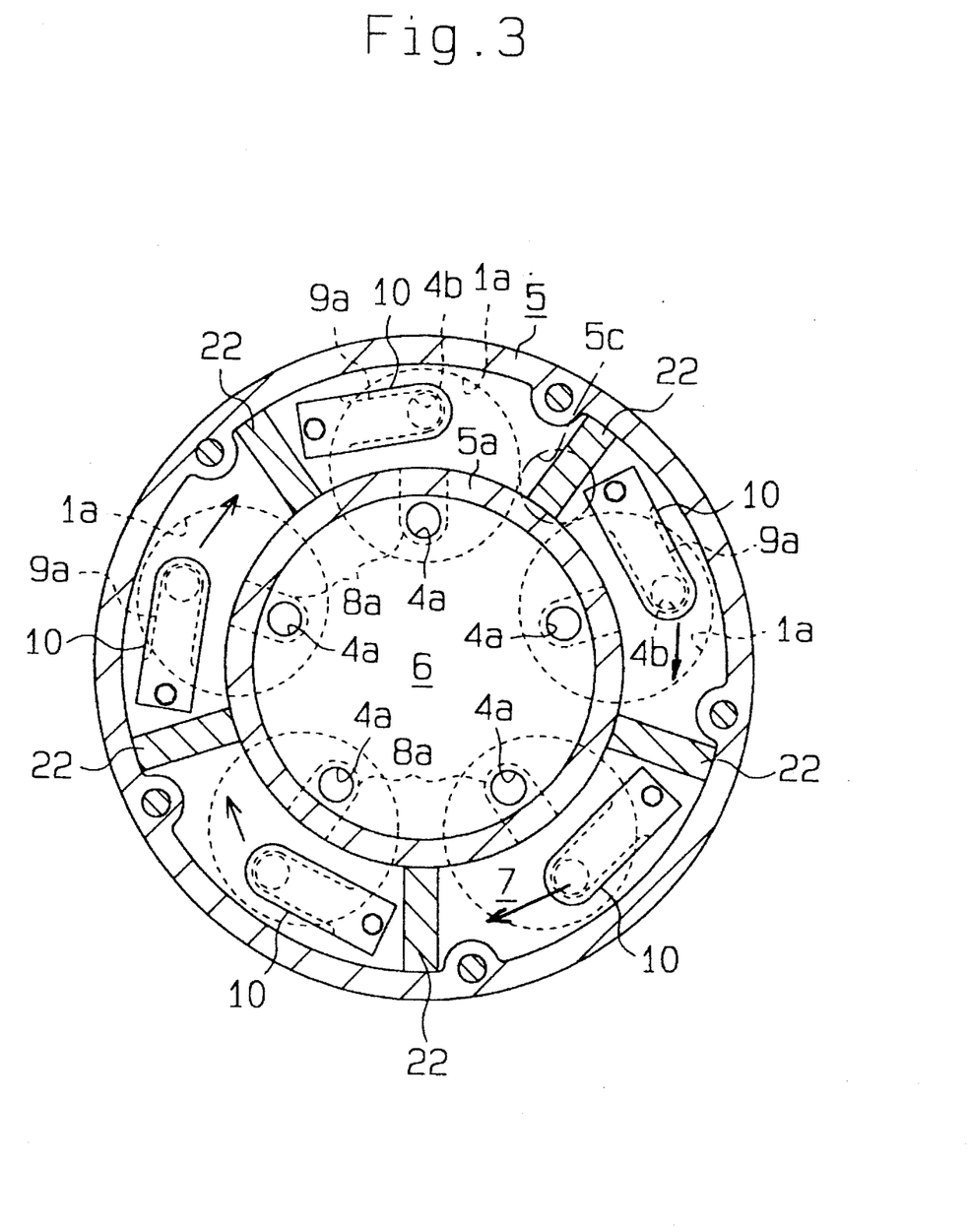
FIG. 3 is a cross-sectional view taken along the line III—III in FIG. 1.
Figure 4:
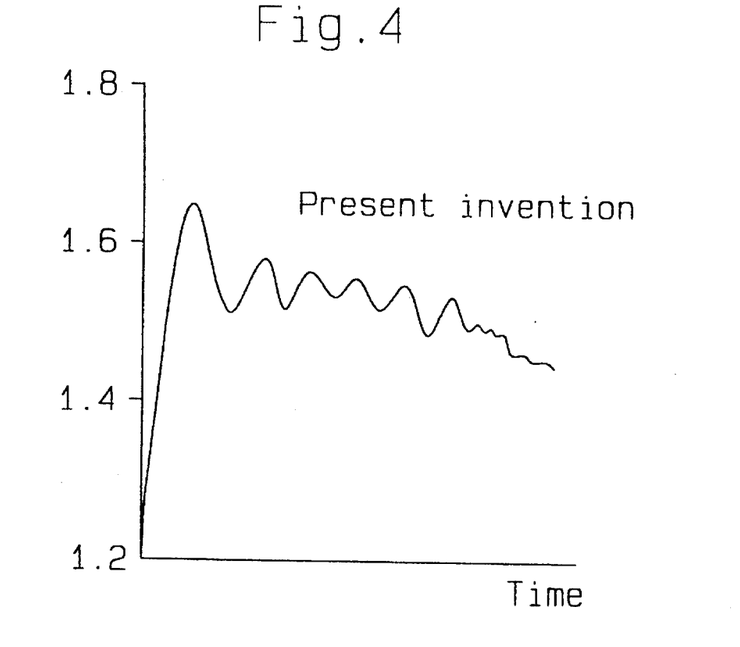
FIG. 4 is a graph showing data obtained from the measurement of the vibration of discharge valves in the compressor shown in FIG. 1.

As shown in FIGS. 2 and 3, a plurality of shielding plates 22 are radially disposed in the annular discharge chamber 7. The proximal end of each shielding plate 22 is in close contact with the discharge-valve forming plate 9 in the vicinity of the proximal end of the associated retainer 10. A clearance 23, formed between the distal end and the rear side of the rear housing 5, allows refrigerant gas to pass between the shielding plate 22 and the rear housing 5. The outlet port 5c faces opposite to the shielding plate 22. To attach the shielding plates 22, both side edges of the shielding plates 22 should be engaged with grooves (not shown) formed in the outer surface of the partition 5a and the inner surface of the rear housing 5. The shielding plates 22 increase the mechanical strength of the rear housing 5.

In the operation of the above-described compressor, refrigerant gas, discharged from one of the discharge holes 4b, flows along the rear internal surface of the discharge chamber 7 toward the shielding plate 22 positioned between two adjacent discharge holes 4b. This is shown by arrows in FIG. 3. In the discharge chamber 7, this flow of refrigerant gas is directed toward a single outlet port 5c through the clearance 23 along the rear internal surface of the discharge chamber 7. As a result, five distinct currents of gas flow from the discharge holes 4b to the outlet port 5c. Each current combines with the other before being exhausted through the outlet port 5c. The combined gas flow is shown in FIG. 3 as flowing in the clockwise direction. Consequently, the flow of refrigerant gas will neither strike an open discharge valve nor cause it to close from an open position. This allows for substantial reduction in the vibration of the discharge valves 9a and for an overall reduction in the generation of compressor noise. Furthermore, the refrigerant gas is discharged from each discharge port in the identical direction. Accordingly, the refrigerant gas discharged from one of the discharge ports does not interfere with the refrigerant gas discharged from the other discharge ports. This improves the gas discharge efficiency.

Generally, the discharge valve with the above-described structure has a specific vibration frequency. When the flow of refrigerant gas resonating at that specific vibration frequency acts on the discharge valve, the vibration of the discharge valve is amplified. This causes refrigerant gas in the cylinder bore to vibrate and results in an increase in compressor noise.

Figure 5:
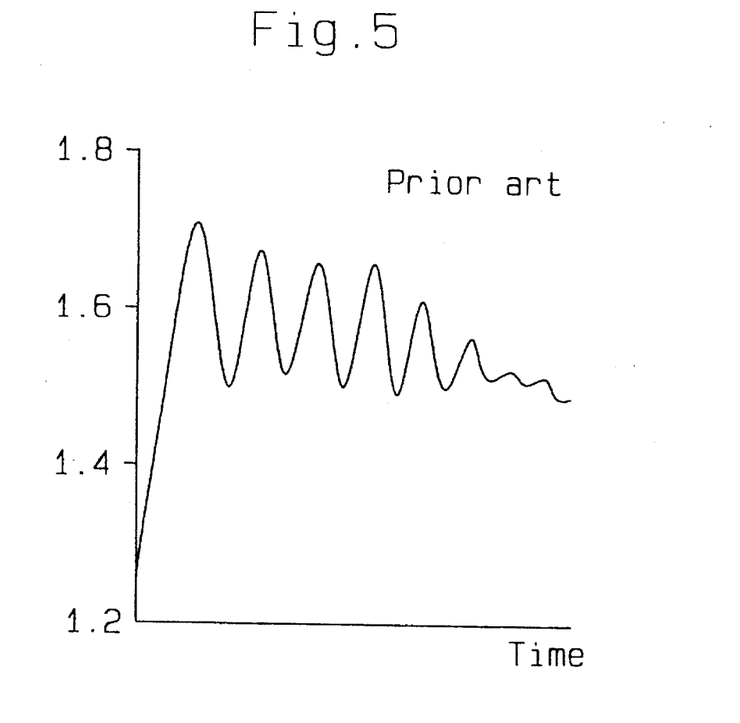
FIG. 5 is a graph showing data obtained from the measurement of the vibration of discharge valves in a conventional compressor.

To study this phenomenon and to determine what level of noise occurs in this embodiment and the prior art, distortion measuring instruments were placed at the proximal end portions of the discharge valves in both cases and the vibrations of the discharge valves were measured. The results revealed that a high-order vibration having a large amplitude frequently occurred in the prior art as shown in the graph in FIG. 5. It is apparent from this that under such conditions an increase in noise would result. In this embodiment, however, the high-order vibration and noise were significantly reduced from that evident in the prior art. This is shown in the graph in FIG. 4. In both graphs, the horizontal scale indicates the time of the compressor's operation, while the vertical scale indicates the output voltage (V) produced by the distortion measuring instrument. When the output voltage was 1.2 V, there was no valve distortion. The distortion, as measured by the distortion measuring instrument, was 0.5 millimeters for every 0.2 V increase in the output voltage.

Figure 6:
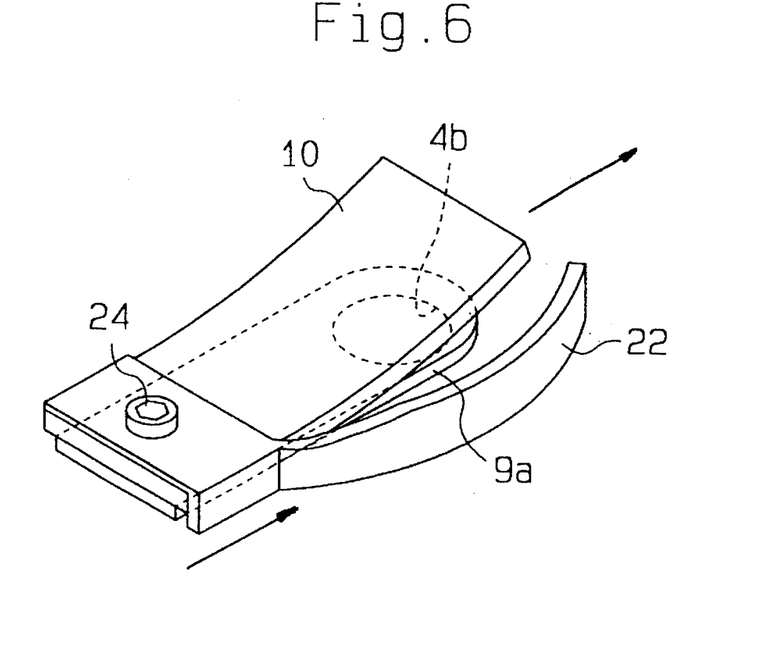
FIG. 6 is a partial cross-sectional view of a compressor according to another embodiment of this invention.

Another embodiment shown in FIG. 6 differs from the above-described embodiment in that the proximal ends of the shielding plates 22 and the proximal ends of the retainers 10 are secured to the valve plate 4 by screws 24. This shielding plate 22 extends from the proximal end toward the distal end of the retainer 10 in such a way as to laterally cover the clearance between the retainer 10 and the discharge valve 9a. Refrigerant gas, discharged from a discharge hole adjacent to a specific discharge hole, would therefore hit against the shielding plate 22 and would not directly hit against the discharge valve. This also reduces the vibration of the discharge valve similar to the above-described embodiment.

Figure 7:
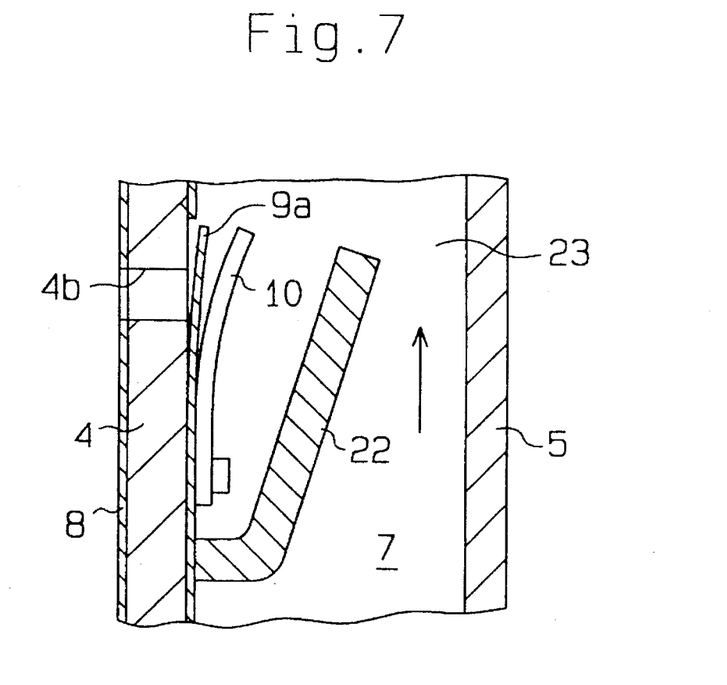
FIG. 7 is a perspective view showing a shielding member according to a further embodiment of this invention.

A further embodiment shown in FIG. 7 differs from the above-described embodiments in that the shielding plate 22 is inclined so as to cover the rear side of the retainer 10. The shielding plate 22 is secured at its proximal end portion near the proximal end of the retainer 10. In this case, since refrigerant gas passing through the clearance 23 is guided along the inclined shielding plate, the gas can have a characteristically smooth flow.

According to the compressor of this invention, as described in detail above, a plurality of shielding members are provided in the discharge chamber in association with a plurality of discharge valves in such a manner that the flow of discharged refrigerant gas from one hole goes around the discharge valves associated with other discharge holes. It is therefore possible to suppress the vibration of the discharge valves caused by the refrigerant gas, and thus, to reduce compressor generated noise.

We claim:

1. A piston type compressor comprising:

a cylinder block having a plurality of cylinder bores formed therein;

a housing secured to said cylinder block, said housing having a center portion and a peripheral portion surrounding the center portion, wherein said center portion includes a suction chamber with an inlet port for receiving uncompressed refrigerant gas and said peripheral portion includes a discharge chamber with an outlet port for receiving and discharging compressed refrigerant gas;

a valve plate disposed between said cylinder block and said housing, said valve plate including a plurality of suction holes for connecting said cylinder bores to said suction chamber, a plurality of suction valves for controlling the opening and closing of said suction holes, a plurality of discharge holes for connecting said cylinder bores to said discharge chamber, a plurality of discharge valves for controlling the opening and closing of said discharge holes, and a surface facing said discharge chamber;

said cylinder bores and said discharge holes being arranged at a predetermined interval around a center axis of said cylinder block, and wherein said discharge valves are arranged in a circumferential array about said valve plate surface constructed in relation to each of said discharge holes for directing when said discharge holes are open compressed refrigerant gas from each of said discharge holes circumferentially in the same direction toward said outlet port;

a plurality of pistons reciprocatable each in a respective one of said cylinder bores for causing said refrigerant gas to open said suction valves and flow through said suction holes into said cylinder bores from said suction chamber, and for compressing said refrigerant gas to cause said gas to open said discharge valves and flow through said discharge holes into said discharge chamber from said cylinder bores; and a plurality of shielding members provided in said discharge chamber in association with said discharge valves, the shielding members guiding the refrigerant gas discharged from any one of said plurality of discharge holes around so as not to cause vibration by striking said discharge valves associated with the remaining discharge holes.

2. A piston type compressor according to claim 1, wherein said cylinder block has a central axis, said cylinder bores and said discharge holes are arranged at equiangular intervals around the center axis of said cylinder block, said discharge valves have proximal end portions spaced away from their associated discharge holes and distal end portions extending over their associated discharge holes, and each discharge valve is movable between a position wherein each discharge valve closes its associated discharge hole and a position wherein said discharge valve opens its associated discharge hole.

3. A piston type compressor according to claim 2, wherein said shielding members are respectively located close to said proximal end portions of said discharge valves, and have proximal end portions in close contact with said valve plate, with clearances formed between distal end portions of said shielding members and an inner wall of said discharge chamber that is opposite said valve plate.

4. A piston type compressor according to claim 1, wherein each discharge valve has a proximal fixed end portion joined to said valve plate and a distal free end portion movable to open and close the associated discharge hole, and said valve plate is provided with retainers for each of said discharge valves for limiting the opening of said discharge valves, said retainers having proximal ends secured to the proximal fixed end portions of the associated discharge valves, and having distal ends overlying said distal free end portions of said discharge valves, said retainers extending obliquely relative to said valve plate surface from said fixed end portions to said free end portions.

5. A piston type compressor according to claim 4, wherein said shielding members extend obliquely relative to said valve plate surface over said retainers, with proximal ends secured to said valve plate and distal ends covering said distal ends of said retainers.

6. A piston type compressor according to claim 1 further comprising a single outlet port formed at the housing, wherein said outlet port is capable of exhausting the refrigerant gas from each discharge hole.

7. A piston type compressor according to claim 6, wherein said inlet port is formed adjacent said outlet port at the housing, said inlet port being capable of introducing the refrigerant gas into the suction chamber.

8. A piston type compressor comprising:

a cylinder block having a plurality of cylinder bores formed therein and a center axis;

a housing secured to said cylinder block, said housing having a center portion and a peripheral portion surrounding the center portion, wherein said center portion includes a suction chamber for receiving uncompressed refrigerant gas and said peripheral portion includes a discharge chamber for receiving and discharging compressed refrigerant gas, and wherein said discharge chamber has an inner wall;

a valve plate disposed between said cylinder block and said housing, said valve plate including a plurality of suction holes for connecting said cylinder bores to said suction chamber, a plurality of suction valves for controlling the opening and closing of said suction holes, a plurality of discharge holes for connecting said cylinder bores to said discharge chamber, a plurality of discharge valves for controlling the opening and closing of said discharge holes, and a surface facing said discharge chamber;

said cylinder bores and said discharge holes being arranged at a predetermined interval around said center axis of said cylinder block, said discharge valves being arranged in a circumferential array about said valve plate surface, each discharge valve being movable between a position wherein it closes its associated discharge hole and a position wherein it opens its associated discharge hole;

a plurality of pistons reciprocatable each in a respective one of said cylinder bores for causing said refrigerant gas to open said suction valves and flow through said suction holes into said cylinder bores from said suction chamber, and for compressing said refrigerant gas to cause said gas to open said discharge valves and flow through said discharge holes into said discharge chamber from said cylinder bores; and a plurality of shielding members accommodated in said discharge chamber in association with said discharge valves, the shielding members guiding the refrigerant gas discharged from any one of said plurality of discharge holes around so as not to cause vibration by striking said discharge valves associated with the remaining discharge holes, said shielding members being respectively located close to end portions of said discharge valves, and having proximal end portions in close contact with said valve plate, with clearances formed between distal end portions of said shielding members and said inner wall of said discharge chamber.

9. A piston type compressor according to claim 8, wherein each discharge valve has a proximal fixed end portion joined to said valve plate and a distal free end portion movable to open and close the associated discharge hole, and said valve plate is provided with retainers for each of said discharge valves for limiting the opening of said discharge valves, said retainers having proximal ends secured to the proximal fixed end portions of the associated discharge valves, and having distal ends overlying said distal free end portions of said discharge valves, said retainers extending obliquely relative to said valve plate surface from said fixed end portions to said free end portions.

10. A piston type compressor according to claim 8, wherein said discharge chamber has a radially inner circumferential wall and a radially outer circumferential wall, and wherein said shielding members are arranged radially between said inner and outer circumferential walls of said discharge chamber.

11. A piston type compressor according to claim 10, wherein said shielding members include plates.

12. A piston type compressor according to claim 8 further comprising a single outlet port formed on the housing, said outlet port being capable of exhausting the refrigerant gas from each discharge port.

13. A piston type compressor according to claim 12 further comprising an inlet port formed adjacent said outlet port on the housing, said inlet port being capable of introducing the refrigerant gas into the suction chamber.

* * * * *

UNITED STATES PATENT AND TRADEMARK OFFICE
CERTIFICATE OF CORRECTION

PATENT NO. : 5,533,870
DATED : July 9, 1996
INVENTOR(S) : K. Takenaka et al

It is certified that error appears in the above-indentified patent and that said Letters Patent is hereby corrected as shown below:

Column 1, line 14, "socking" should read --rocking--.

Column 3, line 16, after "9a" insert --is--.

Column 4, line 42, after "other" insert --current--.

Signed and Sealed this

Twenty-first Day of January, 1997

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,533,870
DATED : July 9, 1996
INVENTOR(S) : Takenaka et al

It is certified that error appears in the above-indentified patent and that said Letters Patent is hereby corrected as shown below:

```
Column 6, line 57, delete "further"; delete entire
 line 58; line 62, delete "at the"; delete entire line 63;
 delete entire line 64.
```

Signed and Sealed this

Seventeenth Day of March, 1998

*Attest:*

BRUCE LEHMAN

*Attesting Officer*  Commissioner of Patents and Trademarks